United States Patent
Wang et al.

(10) Patent No.: US 11,112,891 B2
(45) Date of Patent: Sep. 7, 2021

(54) TOUCH PEN, CONTROL METHOD THEREOF, TOUCH DEVICE AND READABLE STORAGE MEDIUM

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Meng Wang, Beijing (CN); Zhixiang Fang, Beijing (CN); Xuxu Hu, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/848,027

(22) Filed: Apr. 14, 2020

(65) Prior Publication Data

US 2021/0124438 A1   Apr. 29, 2021

(30) Foreign Application Priority Data

Oct. 25, 2019 (CN) .......................... 201911025884.5

(51) Int. Cl.
G06F 3/0354 (2013.01)
G06F 3/044 (2006.01)
G06F 3/041 (2006.01)

(52) U.S. Cl.
CPC ........ *G06F 3/03545* (2013.01); *G06F 3/0441* (2019.05); *G06F 3/04162* (2019.05)

(58) Field of Classification Search
CPC . G06F 3/03545; G06F 3/0441; G06F 3/04162
USPC ........................................................ 345/179
See application file for complete search history.

(56) References Cited

U.S. PATENT DOCUMENTS

| | | | | |
|---|---|---|---|---|
| 5,248,855 A | * | 9/1993 | Cambridge | ......... G06F 3/03545 178/19.01 |
| 5,923,161 A | * | 7/1999 | Frankovitch, Jr. | ... G01R 15/125 324/115 |
| 2005/0001823 A1 | * | 1/2005 | Dort | .................... G06F 3/03545 345/179 |

\* cited by examiner

*Primary Examiner* — Koosha Sharifi-Tafreshi
(74) *Attorney, Agent, or Firm* — Brooks Kushman P.C.

(57) ABSTRACT

A touch pen, a control method thereof, a touch device, a readable storage medium are provided. The touch pen includes a pen body, a controller, a detecting part, an accommodation part. The controller, the detecting part, the accommodation part are on the pen body. The detecting part has a current detecting circuit, there is a conductive fluid in the accommodation part, the accommodation part is connected to the detecting part; at least a part of the current detecting circuit is inside the detecting part, and configured to contact the conductive fluid and form a circuit with the conductive fluid when the pen body is in a tilt posture, and output a corresponding reference value according to magnitude of a current in the circuit. The controller is electrically connected to the current detecting circuit and configured to output a control signal according to the reference value.

20 Claims, 6 Drawing Sheets

TOUCH PEN, CONTROL METHOD THEREOF, TOUCH DEVICE AND READABLE STORAGE MEDIUM

CROSS-REFERENCE TO RELATED APPLICATION

This application claims priority to Chinese Patent Application No. 201911025884.5 filed on Oct. 25, 2019, which is incorporated herein by reference in its entirety.

TECHNICAL FIELD

The present disclosure relates to the technical field of touch display, and in particular, the present disclosure relates to a touch pen, a control method thereof, a touch device, and a readable storage medium.

BACKGROUND

With the development of touch control technology, more and more terminals perform human-computer interaction based on touch control. Touch control methods generally include touching by a human hand or touching by a touch pen. Touch pens are divided into passive touch pen and active touch pen. The passive touch pen has the same principle as hand touch. The active touch pen emits an excitation signal via a pen tip, so that a coupling capacitance is generated between the pen tip and a screen sensor, and then the terminal is enabled to detect touch point coordinates.

SUMMARY

In a first aspect, some embodiments of the present disclosure provide a touch pen, including:

a pen body, a controller, a detecting part, and an accommodation part, where the controller, the detecting part, and the accommodation part are arranged on the pen body;

the detecting part is provided with a current detecting circuit, there is a conductive fluid in the accommodation part, and the accommodation part is connected to the detecting part;

the current detecting circuit is configured to contact the conductive fluid when the pen body is in a tilt posture, form a circuit with the conductive fluid, and output a corresponding reference value according to magnitude of a current in the circuit;

the controller is electrically connected to the current detecting circuit, and is configured to output a control signal according to the reference value.

In a second aspect, some embodiments of the present disclosure provide a touch device, including a first device and the touch pen provided in the embodiments of the present disclosure; the first device is configured to receive the control signal output by the controller of the touch pen.

In a third aspect, some embodiments of the present disclosure provide a method for controlling a touch pen, which is applied to the touch pen provided in the embodiments of the present disclosure, including:

receiving a reference value, where the reference value is output when the pen body is in a tilt posture and the detecting part contacts the conductive fluid; and outputting a control signal according to the reference value.

In a fourth aspect, some embodiments of the present disclosure provide a readable storage medium on which a program is stored. When the program is executed by a touch pen, the method for controlling the touch pen provided in the embodiments of the present disclosure is implemented.

BRIEF DESCRIPTION OF THE DRAWINGS

The above and/or additional aspects and advantages of the present disclosure will become apparent and will be easily understood from the following descriptions of the embodiments in conjunction with the accompanying drawings.

DETAILED DESCRIPTION

The present disclosure is described in detail below. Examples of embodiments of the present disclosure are shown in the drawings, where the same or similar reference numerals indicate the same or similar components or components having the same or similar functions. Further, if detailed descriptions of known technologies are unnecessary for the illustrated features of the present disclosure, they are omitted. The embodiments described below with reference to the drawings are exemplary, and only used to explain the present disclosure, and cannot be construed as limiting the present disclosure.

It will be understood by those skilled in the art that, unless otherwise defined, all terms (including technical and scientific terms) used herein have the same meaning as commonly understood by one of ordinary skill in the art to which this disclosure belongs. It should also be understood that terms such as those defined in the general dictionary should be understood to have meanings consistent with the meanings in the context of the conventional technologies, and unless specifically defined herein, they would not be explained by idealized or overly formal meanings.

Those skilled in the art will understand that, unless specifically stated, otherwise, the singular forms of "a", "an", "the" and "said" may include plural forms. It should be further understood that the wording "including" used in the specification of the present disclosure refers to the presence of the described features, integers, steps, operations, elements and/or components, but does not exclude the presence or addition of one or more other features, integers, steps, operations, elements, components, and/or groups thereof. It should be understood that when an element is referred to as being "connected" or "coupled" to another element, it may be directly connected or coupled to the another element, or an intervening element may also be present. Furthermore, "connected" or "coupled" as used herein may include wireless connection or wireless coupling. The term "and/or" as used herein includes all or any of or all combinations of one or more of associated items as listed.

The following specifically describes the technical solutions of the present disclosure and how the technical solutions of the present disclosure solve the above technical problems with specific embodiments.

A touch pen can generally achieve the corresponding function by detecting the tilt angle of the pen. A touch pen in related technology usually emits an excitation signal via a pen tip, so that a coupling capacitance is generated between the pen tip and a screen sensor, and touch point coordinates are detected. A pressure sensor or Bluetooth module is adopted to detect the tilt angle of the pen. However, the pressure sensor and Bluetooth module are relatively expensive and consume large power, which increases the cost of using the touch pen.

To address the situation in the related technologies that the need for a pressure sensor or a Bluetooth module by the touch pen leads to higher price or higher power consumption, some embodiments of the present disclosure provide a touch pen, a control method thereof, a touch device, and a readable storage medium.

Figure 1:
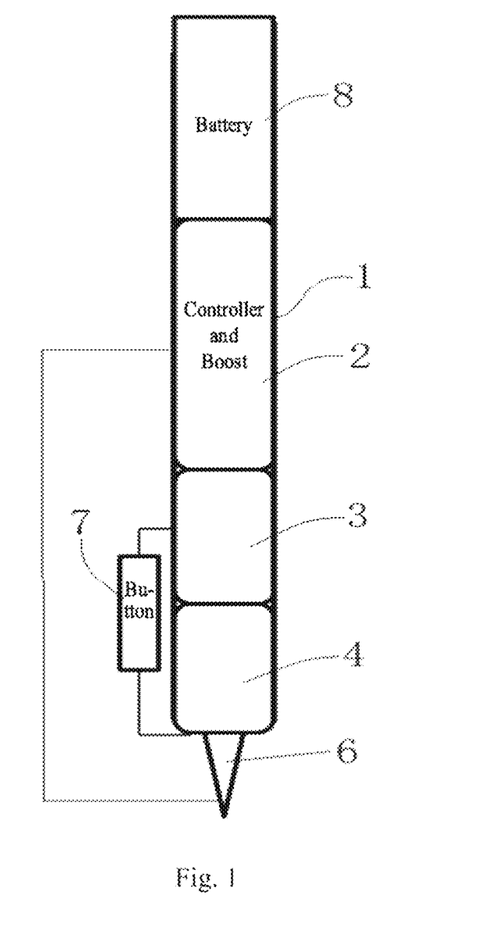
FIG. 1 is a schematic structural diagram of a touch pen provided by some embodiments of the present disclosure.
Figure 2:
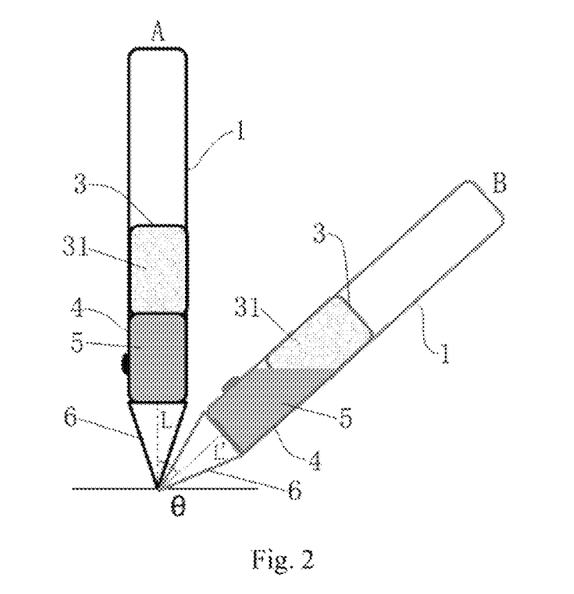
FIG. 2 is a schematic diagram of a use process of a touch pen provided by some embodiments of the present disclosure, which is a perspective view and a controller and a power supply part are omitted.

Some embodiments of the present disclosure provide a touch pen. As shown in FIG. 1 and FIG. 2, the touch pen includes a pen body 1, a controller 2, a detecting part 3, and accommodation part 4 which are provided on the pen body 1. The controller may be a processor, a control circuit, or an integrated chip, and the embodiments of the present disclosure are not limited thereto.

The detecting part 3 is provided with a current detecting circuit 31, there is a conductive fluid 5 in the accommodation part 4, and the accommodation part 4 is connected to the detecting part 3.

At least a part of the current detecting circuit 31 is located inside the detecting part 3, and the current detecting circuit is configured to contact the conductive fluid 5 and form a circuit with the conductive fluid 5 when the pen body 1 is in a tilt posture, and output a corresponding reference value according to magnitude of a current in the circuit.

The controller 2 is electrically connected to the current detecting circuit 31 and is configured to receive a reference value and output a control signal according to the reference value.

It should be noted that, in some embodiments, the pen body 1, the controller 2, the detecting part 3, and the accommodation part 4 may be independent components, and the pen body 1 is only used to carry the controller 2, the detecting part 3, and the accommodation part 4. In some embodiments, a partial region of the pen body 1 may belong to at least one of the controller 2, the detecting part 3, and the accommodation part 4.

In some embodiments of the present disclosure, as shown in FIG. 1, the controller 2 may include a boost circuit.

The conductive fluid 5 has conductivity, and may be, for example, an electrolytic solution. When the touch pen is tilted, the conductive fluid 5 in the accommodation part 4 flows into the detecting part 3 and contacts the current detecting circuit 31, and forms a circuit with the current detecting circuit 31 to generate a current. When the touch pen is in a different tilt posture, the amount of the conductive fluid 5 flowing into the detecting part 3 changes, so that the circuit structure of the circuit formed by the current detecting circuit 31 and the conductive fluid 5, the current in the circuit, and the reference value output by the detecting part 3 change accordingly. Since the controller 2 can output corresponding signals according to different reference values, the user only needs to change the tilt posture of the touch pen to enable the controller 2 of the touch pen to change the outputted signals, thereby realizing related functions. The current detecting circuit 31 of the touch pen and the accommodation part 4 containing the conductive fluid 5 replace the pressure sensor and the Bluetooth module in the touch pen in the related technologies. The structure is simpler and the response speed is faster, which saves costs and reduces power consumption.

Taking FIG. 2 as an example, the touch pen is in a vertical state at position A, the tilt angle is 0, and the current detecting circuit 31 is not in contact with the conductive fluid 5. The touch pen is tilted rightwards from position A to position B, in this case, the touch pen is in a tilt posture with a tilt angle of $\theta$, and a part of the current detecting circuit 31 is in contact with the conductive fluid 5 to form a corresponding circuit and generate a current.

In the embodiments of the present disclosure, the vertical state of the touch pen may refer to that that a center axis of the pen body 1 of the touch pen is parallel or substantially parallel to the direction of gravity; in this case, the tilt angle of the touch pen is 0.

It should be noted that both the dotted line L and the dotted line L' in FIG. 2 indicate the central axis of the pen body 1. In the embodiments of the present disclosure, the tilt angle of the touch pen at the current position refers to the angle between the touch pen's center axis L' at the current position and the touch pen's center axis L at position A. For example, the tilt angle $\theta$ is the angle between the center axis L' of the touch pen at position B and the center axis L of the touch pen at position A.

When the touch pen is tilted rightwards from position A to position B, the current detecting circuit 31 and the conductive fluid 5 may form at least one circuit, and each circuit generates a corresponding current.

In some embodiments, each current value corresponds to a reference value.

The relationship between the tilt angle of the touch pen and the value of the current generated by the circuit may be determined according to the structural characteristics of the current detecting circuit 31. For example, the greater the tilt angle of the touch pen is, the greater the value of the current generated by the circuit is (i.e., the value of the current have a positive correlation with the tilt angle); or, the greater the tilt angle of the touch pen is, the smaller the value of the current generated by the circuit is (i.e., the value of the current has a negative correlation with the tilt angle). The signal output by the controller 2 changes with the value of the current in the circuit.

Figure 3:
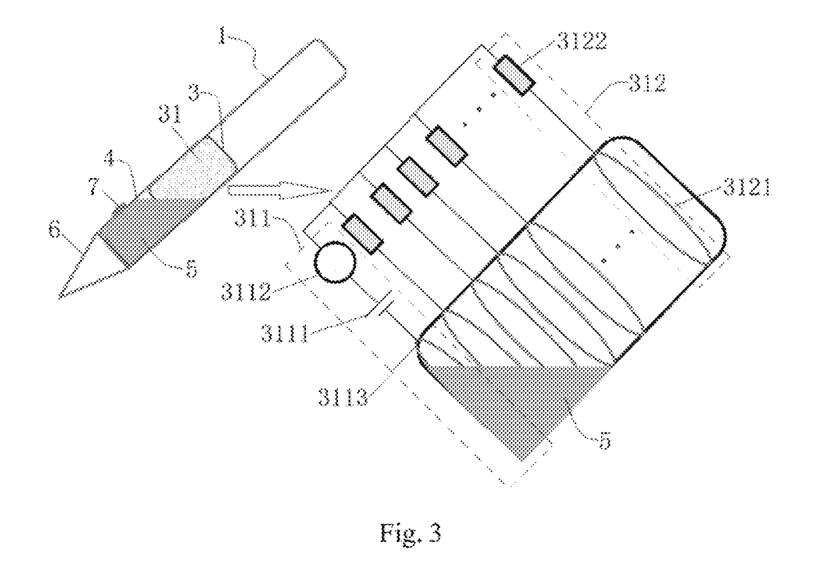
FIG. 3 is a schematic diagram of a touch pen in a tilted state and a specific structural diagram of a detecting part according to some embodiments of the present disclosure, which is a perspective view.

In some embodiments of the present disclosure, as shown in FIG. 3, the current detecting circuit 31 includes a main circuit 311 and a plurality of conductor branches 312.

The main circuit 311 includes a power supply 3111 and a detector 3112 connected in series. A first end of the main circuit 311 is connected to a fixed end of each conductor branch 312. The second end of the main circuit 311 and the free ends of the plurality of conductor branches 312 are arranged at intervals in the detecting part 3 in a first direction.

When the pen body 1 is in a tilt posture, and the second end of the main circuit 311 and the free end of the at least one conductor branch 312 contact the conductive fluid 5, the main circuit 311, the at least one conductor branch 312, and the conductive fluid 5 form a circuit. The detector 3112 is electrically connected to the controller 2 and is configured to output a corresponding reference value according to magnitude of the current in the circuit.

It should be noted that the quantity of conductor branches 312 and the separation distance between the free ends of the conductor branches 312 may be determined according to actual design needs. As shown in FIG. 3, the first end of the main circuit 311 is a connection end of the detector 3112 away from the power supply 3111, and the second end is a connection end of the power supply 3111 away from the detector 3112 (for example, may be the negative electrode end of the power supply 3111). The connection end of the conductor branch 312 for connecting the detector 3112 is a fixed end, and the other connection end of the conductor branch 312 is a free end.

In some embodiments, as shown in FIG. 3, the first direction may be parallel to the axis of the touch pen. The first direction may form an angle with the axis of the touch pen, and the value of the angle may be determined according to actual design requirements.

When the second end of the main circuit 311 and the free end of the conductor branch 312 are not in contact with the conductive fluid 5, the two are in an open state; when the second end of the main circuit 311 and the free end of at least one conductor branch 312 are in contact with the conductive fluid 5, the conductive fluid 5 is equivalent to a wire at this time, which enable a path between the second end of the main circuit 311 and the free end of the conductor branch 312 to be turned on, so that the main circuit 311, the conductor branch 312 and the conductive fluid 5 form a circuit and generate a current.

As shown in FIG. 3, the second end of the main circuit 311 and the free ends of the three conductor branches 312 are in contact with the conductive fluid 5, and a connection between the second end of the main circuit 311 and the free ends of the three conductor branches 312 is turned on, to form a circuit where the three conductor branches 312 are all connected in parallel with the main circuit.

When the touch pen is in different tilt postures, the amounts of the conductive fluid 5 flowing into the detecting part 3 change, so the quantities of the conductor branches 312 contacted by the conductive fluid 5 change accordingly, thereby forming circuits with different circuit structures. A corresponding current is generated in each circuit, and the detector 3112 may output a corresponding reference value according to the magnitude of the current in the circuit.

For the touch pen shown in FIG. 3, the increase in the tilt angle of the touch pen causes increase in the quantity of the conductor branches 312 that the conductive fluid 5 contacts. For example, when the tilt angle of the touch pen is 10 degrees, two conductor branches 312 are in contact with the conductive fluid 5, and the main circuit 311, the conductive fluid 5 and the two conductor branches 312 form a circuit; when the tilt angle of the touch pen is 30 degrees, six conductor branches 312 are in contact with the conductive fluid 5, and the main circuit 311, the conductive fluid 5 and the six conductor branches 312 form a circuit.

Figure 4:
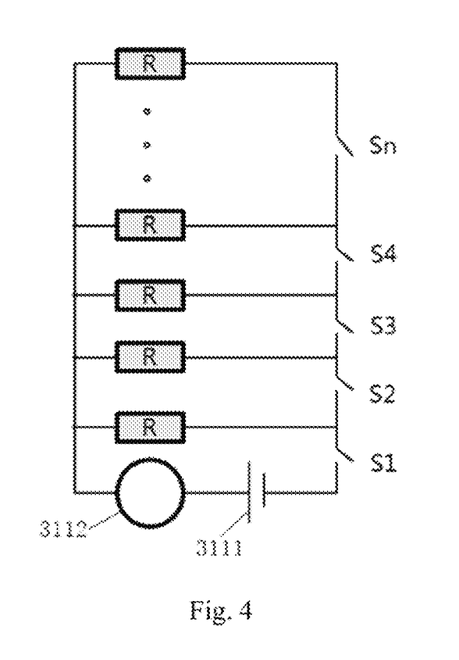
FIG. 4 is an equivalent circuit diagram of a current detecting circuit provided by some embodiments of the present disclosure.

In the touch pen shown in FIG. 3, the conductor branch 312 may be equivalent to a resistor R, and the current detecting circuit 31 may be equivalent to a circuit shown in FIG. 4. In the circuit shown in FIG. 4, Si to Sn represent switches, and n is a positive integer. When the switch is turned off, it means that the free end of the conductor branch 312 corresponding to the switch is not in contact with the conductive fluid 5; when the switch is turned on, it means that the free end of the conductor branch 312 corresponding to the switch is in contact with the conductive fluid 5. For example, when the second end of the main circuit 311 and the free end of the first conductor branch 312 are both in contact with the conductive fluid 5, it is equivalent to turning on the switch Si in the circuit shown in FIG. 4. When the circuit includes more than two conductor branches 312, the conductor branches 312 are connected in parallel with each other. Therefore, the larger the quantity of conductor branches 312 in the circuit is, the larger the value of the current generated by the circuit is.

Considering that the flow of the conductive fluid 5 may be affected by environmental factors such as vibration, the value of the current generated by the circuit may be affected by environmental disturbances. Therefore, a shock absorber or a buffer may be provided in the touch pen to reduce the effect of environment disturbance.

In some embodiments of the present disclosure, as shown in FIG. 3, the second end of the main circuit 311 is a first ring-shaped wire 3113, and the free end of the conductor branch 312 is a second ring-shaped wire 3121. The first ring-shaped wire 3113 and the plurality of second ring-shaped wires 3121 are coaxial, and are arranged at intervals in a first direction in the detecting part 3. In the embodiments of the present disclosure, the second end of the main circuit 311 and the free end of the conductor branch 312 are not limited to a ring-shaped wire, and may be wires of other shapes or other structures.

When both the first ring-shaped wire 3113 and the second ring-shaped wire 3121 are in contact with the conductive fluid 5, the main circuit 311, the conductor branch 312 to which the second ring-shaped wire 3121 belongs, and the conductive fluid 5 form a circuit. For the touch pen provided in the embodiments, when the touch pen is tilted in any direction, it can be ensured that the second end of the main circuit 311 and the free end of the conductor branch 312 are in contact with the conductive fluid 5, which is convenient for a user to use.

Figure 5:
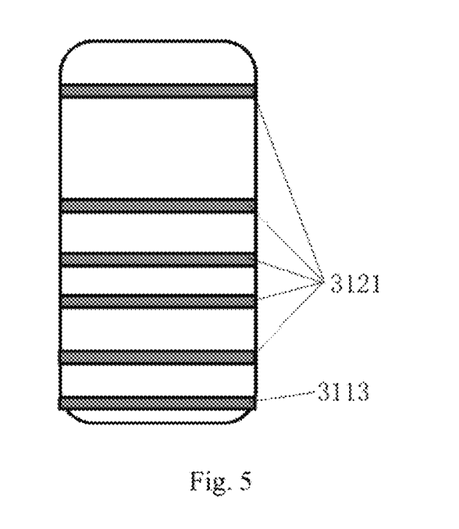
FIG. 5 is a partial sectional view of a detecting part provided by some embodiments of the present disclosure.

In some embodiments, as shown in FIG. 5, the first ring-shaped wire 3113 and the second ring-shaped wire 3121 are made of a conductive material (such as a black frame in the figure), and the conductive material may be copper. The conductive material may be provided in a ring shape. Those skilled in the art can understand that, since FIG. 5 is a sectional view, the black frame in the figure only represents a part of the conductive material. Insulation regions are between the first ring-shaped wire 3113 and the second ring-shaped wire 3121 and between two adjacent second ring-shaped wires 3121.

In some embodiments of the present disclosure, as shown in FIG. 3, the conductor branch 312 further includes a first resistor 3122. The first end of the main circuit 311 is electrically connected to an end of the first resistor 3122, and the other end of the resistor is electrically connected to the second ring-shaped wire.

In some embodiments, the resistance value and quantity of the first resistor 3122 in the conductor branch 312 may be determined according to actual design requirements. An end portion of the first resistor 3122 which is connected to the main circuit 311 is a fixed end of the conductor branch 312.

In some embodiments, in the touch pen, the detecting part 3 and the accommodation part 4 may be integrally formed with the pen body 1 or may be independent components. The following describes several types of structures of the detecting part 3 and the accommodation part 4.

In some embodiments of the present disclosure, the pen body has a hollow groove arranged axially therein, the accommodation part and the detecting part are located in the hollow groove, and the accommodation part is located on a side of the detecting part close to a pen tip of the pen body. The hollow groove is divided into adjacent first and second regions in the axial direction; the accommodation part includes the first region, and the detecting part includes the second region; the first ring-shaped wire and the plurality of the second ring-shaped wires are arranged at intervals in the axial direction in the second region.

Figure 6:
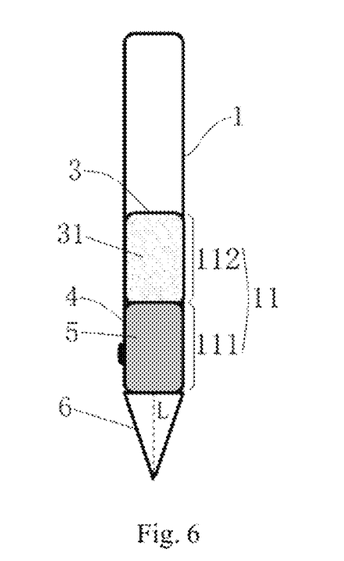
FIG. 6 is a schematic structural diagram of a touch pen provided by some embodiments of the present disclosure.

In some embodiments of the present disclosure, as shown in FIG. 6, the detecting part 3 and the accommodation part 4 are parts that are integrally formed with the pen body 1. The pen body 1 has a hollow groove 11 provided therein in the axial direction. The hollow groove 11 is divided, in the axial direction, into a first region 111 and a second region 112 adjacent to each other. The first region 111 is close to the pen tip 6 of the pen body 1. The accommodation part 4 includes the first region 111, and the detecting part 3 includes the second region 112. The first ring-shaped wire 3113 and the plurality of second ring-shaped wires 3121 are arranged at intervals in the axial direction in the second region 112.

In some embodiments of the present disclosure, the touch pen further includes a tubular member arranged in an inside or on an outer surface of the pen body, the accommodation part and the detecting part are located in the tubular member, and the accommodation part is located on a side of the detecting part close to the pen tip part of the pen body. The tubular member is divided into adjacent first and second portions in its axial direction; the accommodation part includes the first portion, the detecting part includes the second portion; the first ring-shaped wire and the plurality of second ring-shaped wires are arranged at intervals in an axial direction in the second portion.

Figure 7:
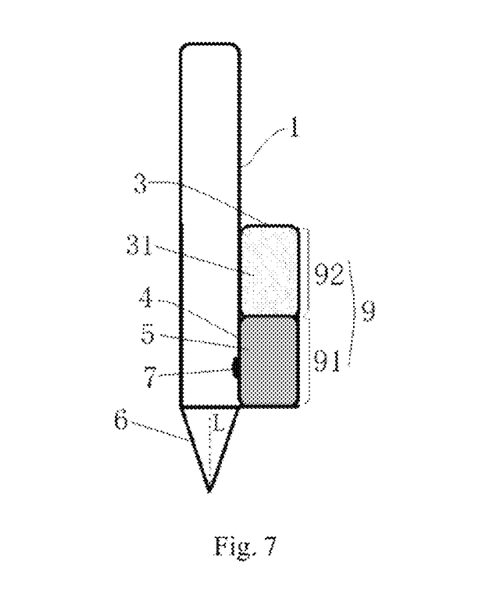
FIG. 7 is a schematic structural diagram of a touch pen provided by some embodiments of the present disclosure.

In some embodiments of the present disclosure, as shown in FIG. 7, the detecting part 3 and the accommodation part 4 are integrally formed members, and are independent of the pen body 1. The touch pen includes a tubular member 9 provided in the inside or on the outer surface of the pen body 1. In FIG. 7, the tubular member 9 is provided on the outer surface of the pen body 1.

The tubular member 9 is divided into a first portion 91 and a second portion 92 in its axial direction, which are adjacent, and the first portion 91 is close to the pen tip part 6 of the pen body 1. The accommodation part 4 includes the first portion 91, and the detecting part 3 includes the second portion 92; the first ring-shaped wire 3113 and the plurality of second ring-shaped wires 3121 are arranged in the second portion 92 at intervals in the axial direction.

In some embodiments of the present disclosure, the accommodation part includes a first cavity for receiving the conductive fluid, the detecting part is a cylinder, and the first cavity is connected to the inside of the detecting part. The first ring-shaped wire and the plurality of second ring-shaped wires are arranged at intervals in the detecting part in an axial direction of the detecting part.

Figure 8:
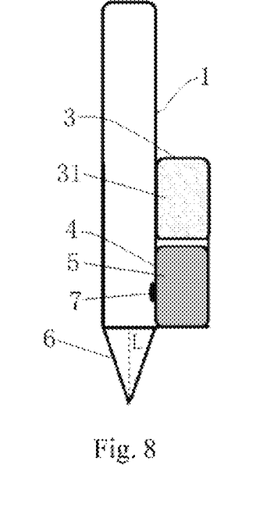
FIG. 8 is a schematic structural diagram of a touch pen provided by some embodiments of the present disclosure.

In some embodiments of the present disclosure, as shown in FIG. 8, the detecting part 3 and the accommodation part 4 are both separate components from the pen body 1. The accommodation part 4 includes a first cavity for receiving the conductive fluid 5, the detecting part 3 is a cylinder, and the first cavity is connected to the inside of the detecting part 3. In FIG. 8, both the detecting part 3 and the accommodation part 4 are provided on the outer surface of the pen body 1. The first ring-shaped wire 3113 and the plurality of second ring-shaped wires 3121 are arranged in the detecting part 3 at intervals in the axial direction of the detecting part 3.

It should be noted that the gap between the detecting part 3 and the accommodation part 4 in FIG. 8 is to distinguish between the detecting part 3 and the accommodation part 4, and indicates that the detecting part 3 and the accommodation part 4 are independent components. In an actual product, there is no gap between the detecting part 3 and the accommodation part 4, or, the detecting part 3 and the accommodation part 4 are communicating with each other through an additional structure (for example, a tube).

Figure 9:
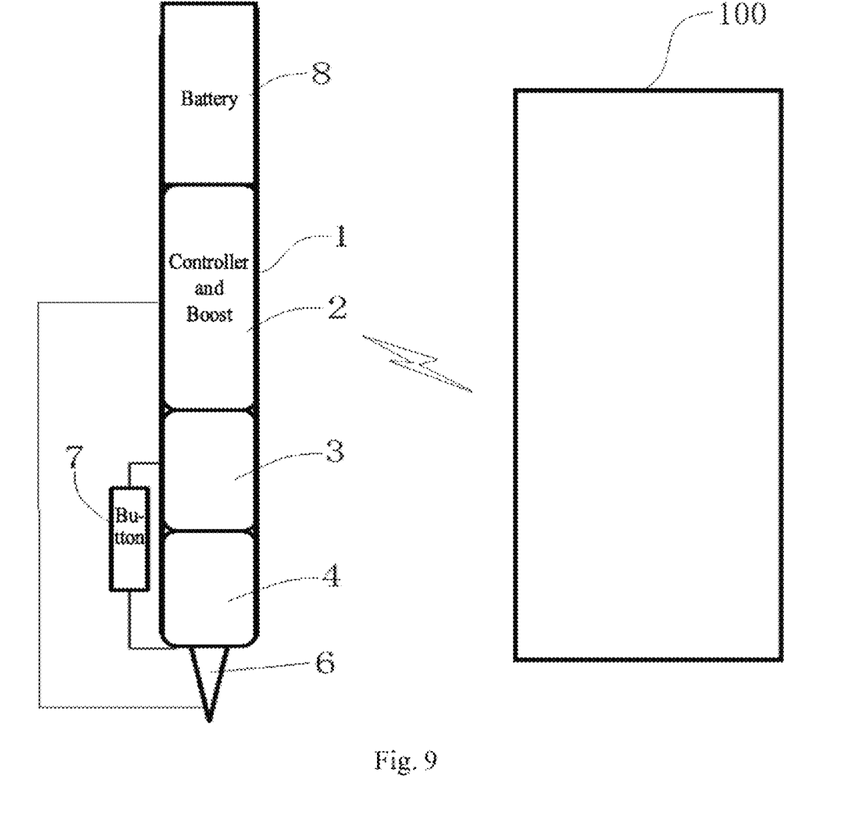
FIG. 9 is a schematic structural diagram of a touch device according to some embodiments of the present disclosure.

In some embodiments, as shown in FIG. 9, the control signal output by the controller 2 according to the reference value may be used to control the first device 100. The user may control the first device 100 to output a corresponding result by changing the tilt angle of the touch pen. The following describes the application scenarios of the touch pen:

In some embodiments of the present disclosure, the controller 2 is electrically connected to the pen tip part 6 of the pen body 1 and is configured to transmit an excitation signal with a first frequency to the screen of the first device 100 via the pen tip part 6 according to the received reference value. Specifically, the excitation signal may be an alternating current excitation signal.

The relationship between the tilt angle of the pen body 1 and the excitation signal may be determined according to actual design needs. Specifically, the value of the first frequency may be determined according to actual design requirements.

Figure 10:
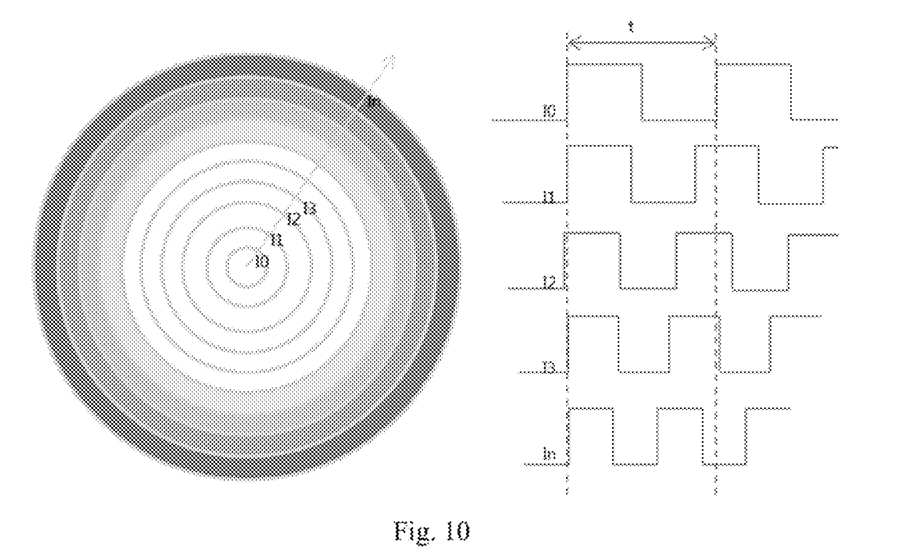
FIG. 10 is a schematic diagram of a correspondence relationship between a current in a circuit and a frequency of an excitation signal output by a controller provided by some embodiments of the present disclosure.

FIG. 10 shows a correspondence between the current in the circuit and the frequency of the excitation signal output by the controller 2. In FIG. 10, I0 to In represents the current generated in each circuit as the tilt angle of the pen body 1 increases. The larger the radius of the circle in FIG. 10 is, the larger the current value is. Each current corresponds to a waveform, and the waveform can reflect the frequency of the excitation signal output by the controller 2. Those skilled in the art can understand that, within a unit time t, the larger the quantity of waveform transformations is, the higher the frequency of the excitation signal is.

Taking the relationship shown in FIG. 10 as an example, the larger the tilt angle of the pen body 1 is, the larger the value of the current generated by the circuit is, and the larger the reference value output by the circuit is. The larger the reference value is, the higher the frequency of the excitation signal output by the controller 2 is, that is, the frequency of the excitation signal has a positive correlation with the reference value. Or, the larger the reference value is, the lower the frequency of the excitation signal output by the controller 2 is, that is, the frequency of the excitation signal has a negative correlation with the reference value. When the touch pen is in the writing mode, the thickness of the line displayed on the screen of the first device 100 may be related to the frequency of the received excitation signal. In some embodiments, the higher the frequency of the excitation signal received by the screen is, the thicker the line displayed on the screen is. Or, the higher the frequency of the excitation signal received by the screen is, the thinner the line displayed on the screen is.

When a user uses the touch pen provided in the embodiments of the present disclosure to write on the screen of the first device 100, the thickness of the scribe line displayed on the screen may be changed by changing the tilt angle of the touch pen.

In some embodiments of the present disclosure, the controller 2 is configured to be in communication connection with a first communication module (for example, may be a communication circuit) of the first device 100, and transmit the preset control signal to the first communication module according to the received reference value, so that the first device 100 is enabled to perform a corresponding operation according to the control signal.

In some embodiments, the controller 2 and the first communication module may be in a wired communication connection or a wireless communication connection.

In some embodiments, the controller 2 transmits a control signal for screen brightness to the first communication module according to the received reference value. For example, the larger the tilt angle of the touch pen is, the lower the brightness of the screen is. Or, the larger the tilt angle of the touch pen is, the higher the brightness of the screen is.

In some embodiments, the controller 2 transmits a control signal for volume to the first communication module according to the received reference value. For example, the larger the tilt angle of the touch pen is, the higher the volume output by the first device 100 is. Or, the larger the tilt angle of the touch pen is, the lower the volume output by the first device 100 is.

In some embodiments, the controller 2 transmits a control signal for cursor to the first communication module according to the received reference value. For example, by changing the tilt angle of the touch pen, the position of the cursor displayed on the screen is changed.

In some embodiments, the first controller 2 transmits a control signal for vibration to the first communication module according to the received reference value. For example, the larger the tilt angle of the touch pen is, the larger the vibration of the first device 100 is. Or, the larger the tilt angle of the touch pen is, the smaller the vibration of the first device 100 is.

It should be noted that the above only lists part of the application scenarios of the touch pen. The touch pen may also be applied in more scenarios. For example, the controller 2 sends a signal to the first communication module according to the received reference value to control other parameters of the first device 100 or to perform other corresponding preset operations, which are not described herein.

In some embodiments of the present disclosure, as shown in FIG. 1, the touch pen further includes a button 7. The button 7 is configured to set an operating mode of the touch pen (such as setting as writing mode).

In some embodiments of the present disclosure, as shown in FIG. 1, the touch pen further includes a power supply part (for example, battery) 8. The power supply part 8 is electrically connected to the controller 2 and is configured to provide power for the controller 2.

In some embodiments, the power supply 3111 in the detecting part 3 may be a part of the power supply part 8, that is, the power supply part 8 may provide power for the detecting part 3.

Based on the same inventive concept, as shown in FIG. 9, some embodiments of the present disclosure further provide a touch device, including a first device 100 and the touch pen provided in the embodiments of the present disclosure. The first device is configured to receive the control signal outputted from the controller of the touch pen, to perform a corresponding operation according to the control signal. For an example in which the first device performs a corresponding operation according to the control signal, reference may be made to the descriptions in the foregoing embodiments, which are not described herein.

The touch device provided by the embodiments of the present disclosure has the same inventive concept and the same beneficial effects as the previous embodiments. For the content not shown in detail in the touch device, reference may be made to the previous embodiments, which is not repeated herein.

Figure 11:
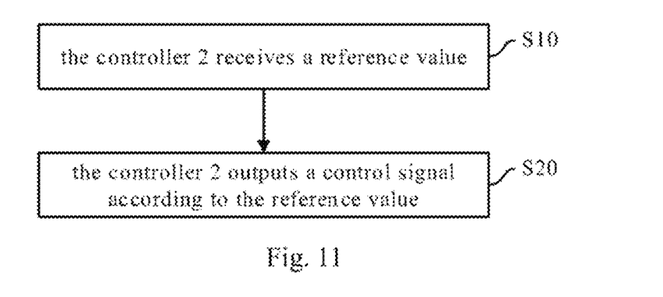
FIG. 11 is a schematic flowchart of a method for controlling a touch pen provided by some embodiments of the present disclosure.

Based on the same inventive concept, some embodiments of the present disclosure also provide a method for controlling a touch pen. The control method may be applied to the touch pen provided in the above embodiments of the present disclosure. A schematic flowchart of the control method is shown in FIG. 11, which include steps as follows.

S10: The controller 2 receives a reference value.

The reference value is outputted when the pen body 1 is in a tilt posture and the detecting part 3 contacts the conductive fluid 5.

When the touch pen is tilted, the conductive fluid 5 in the accommodation part 4 flows into the detecting part 3 and contacts the current detecting circuit 31, and forms a circuit with the current detecting circuit 31 to generate a current. When the touch pen is in different tilt postures, the amount of the conductive fluid 5 flowing into the detecting part 3 changes, so that the circuit structure of the circuit formed by the current detecting circuit 31 and the conductive fluid 5, the current in the circuit, and the reference value outputted by detecting part 3 change accordingly.

Taking FIG. 2 as an example, the touch pen is in a vertical state at position A, the tilt angle is 0, and the current detecting circuit 31 is not in contact with the conductive fluid 5. The touch pen is tilted rightwards from position A to position B, in this case, the touch pen is in a tilt posture with a tilt angle of θ, and a part of the current detecting circuit 31 is in contact with the conductive fluid 5 to form a corresponding circuit and generate a current.

It should be noted that during the process in which the touch pen is tilted rightwards from position A to position B, the current detecting circuit 31 and the conductive fluid 5 may form at least one circuit, and each circuit generates a corresponding current.

In some embodiments, each current value corresponds to a reference value.

The relationship between the tilt angle of the touch pen and the value of the current generated by the circuit may be determined according to the structural characteristics of the current detecting circuit 31. For example, the greater the tilt angle of the touch pen is, the greater the value of the current generated by the circuit is; or, the greater the tilt angle of the touch pen is, the smaller the value of the current generated by the circuit is. The signal output by the controller 2 changes with magnitude of the current in the circuit.

S20: The controller 2 outputs a control signal according to the reference value.

The control signal output by the controller 2 according to the reference value may be used to control the first device 100. The user may control the first device 100 to output a corresponding result by changing the tilt angle of the touch pen.

In some embodiments of the present disclosure, as shown in FIG. 9, the controller 2 is electrically connected to the pen tip part 6 of the pen body 1. The controller 2 transmits an excitation signal with a first frequency to the screen of the first device 100 via the pen tip part 6 according to the received reference value.

The relationship between the tilt angle of the pen body 1 and the excitation signal may be determined according to actual design needs.

FIG. 10 shows a correspondence between the current in the circuit and the frequency of the excitation signal output by the controller 2. In FIG. 10, IO to In represents the current generated in each circuit as the tilt angle of the pen body 1 increases. The larger the radius of the circle in FIG. 10 is, the larger the current value is. Each current corresponds to a waveform, and the waveform can reflect the frequency of the excitation signal output by the controller 2. Those skilled in the art can understand that, within a unit time t, the larger the quantity of waveform transformations is, the higher the frequency of the excitation signal is.

Taking the relationship shown in FIG. 10 as an example, the larger the tilt angle of the pen body 1 is, the larger the value of the current generated by the circuit is, the larger the reference value output by the circuit is, and the higher the frequency of the excitation signal output by the controller 2 is. When the touch pen is in the writing mode, the thickness of the line displayed on the screen of the first device 100 may be related to the frequency of the received excitation signal. In some embodiments, the higher the frequency of the excitation signal received by the screen is, the thicker the line displayed on the screen is. Or, the higher the frequency of the excitation signal received by the screen is, the thinner the line displayed on the screen is.

When a user uses the touch pen provided in the embodiments of the present disclosure to write on the screen of the first device 100, the thickness of the scribe line displayed on the screen may be changed by changing the tilt angle of the touch pen.

In some embodiments of the present disclosure, the controller 2 is configured to be in communication connection with a first communication module of the first device 100. The controller 2 transmits the preset control signal to the first communication module according to the received reference value, so that the first device 100 is enabled to perform a corresponding operation according to the control signal.

In some embodiments, the controller 2 and the first communication module may be in a wired communication connection or a wireless communication connection.

In some embodiments, the controller 2 transmits a control signal for screen brightness to the first communication module according to the received reference value. For example, the larger the tilt angle of the touch pen is, the lower the brightness of the screen is. Or, the larger the tilt angle of the touch pen is, the higher the brightness of the screen is.

In some embodiments, the controller 2 transmits a control signal for volume to the first communication module according to the received reference value. For example, the larger the tilt angle of the touch pen is, the higher the volume output by the first device 100 is. Or, the larger the tilt angle of the touch pen is, the lower the volume output by the first device 100 is.

In some embodiments, the controller 2 transmits a control signal for cursor to the first communication module according to the received reference value. For example, by changing the tilt angle of the touch pen, the position of the cursor displayed on the screen is changed.

It should be noted that the above only lists a part of the application scenarios of the touch pen, and the touch pen may also be applied in more scenarios, which is not repeated herein.

The method for controlling the touch pen provided in the embodiments of the present disclosure has the same inventive concept and the same beneficial effects as the embodiments described above. For content not shown in detail in the method for controlling the touch pen, reference may be made to the foregoing embodiments, which is not repeated herein.

Based on the same inventive concept, some embodiments of the present disclosure further provide a readable storage medium. A computer program is stored on the readable storage medium. When the computer program is executed by a touch pen, the method for controlling the touch pen provided by the foregoing embodiments of the present disclosure is implemented.

The computer readable medium includes, but is not limited to, any type of disk (including floppy disk, hard disk, optical disk, CD-ROM, and magneto-optical disk), ROM, RAM, and EPROM (Erasable Programmable Read-Only Memory), EEPROM, flash memory, magnetic or optical card. That is, the readable medium includes any medium that stores or transfers information in a readable form by a device (e.g., a computer).

The readable storage medium provided by the embodiments of the present disclosure has the same inventive concept and the same beneficial effects as the foregoing embodiments. For the content not shown in detail in the readable storage medium, reference may be made to the foregoing implementations, which is not repeated herein.

By adopting the embodiments of the present disclosure, at least the following beneficial effects can be achieved.

1. When the touch pen is tilted, the conductive fluid in the accommodating part will flow into the detecting part and contact the current detecting circuit, and form a circuit with the current detecting circuit to generate a current. When the touch pen is in a different tilt posture, the amount of conductive fluid flowing into the detecting part changes, so that the circuit structure of the circuit formed by the current detecting circuit and the conductive fluid, the current in the circuit, and the reference value output by the detecting part are changed accordingly. Since the controller can output corresponding signals according to different reference values, the user only needs to change the tilt posture of the touch pen to enable the controller of the touch pen to change the outputted signal, thereby realizing related functions. In the touch pen, the current detecting circuit and the accommodation part containing the conductive fluid replace a pressure sensor and a Bluetooth module in a touch pen in the related technologies. The structure is simpler and the response speed is faster, which saves costs and reduces power consumption.

2. The second end of the main circuit is a first ring-shaped wire, and the free end of the conductor branch is a second ring-shaped wire. The first ring-shaped wire and the plurality of second ring-shaped wires are arranged coaxially. When the touch pen is tilted in any direction, it can be ensured that the second end of the main circuit and the free end of the conductor branch are in contact with the conductive fluid, which is convenient for a user.

Those skilled in the art can understand that steps, measures, or solutions in various operations, methods or processes that have been discussed in the present disclosure may be alternated, changed, combined, or deleted. Further, other steps, measures, or solutions in various operations, methods or processes that have been discussed in the present disclosure can be alternated, modified, rearranged, decomposed, combined, or deleted. Further, steps, measures, or solutions in various operations, methods or processes in the conventional technologies can be alternated, modified, rearranged, decomposed, combined, or deleted.

In the descriptions of the present disclosure, it needs to be understood that orientation or positional relationship indicated by the term of "center", "up", "down", "front", "rear", "left", "right", "vertical", "horizontal", "top", "bottom", "inside", or "outer", etc., is based on the drawings, and are only for the convenience of describing the present disclosure and simplifying the description, and not intended to indicate or imply that the device or element as referred to must have a specific orientation or be constructed and operated in a specific orientation, and therefore cannot be understood as a limitation to the present disclosure.

The terms "first" and "second" are used for descriptive purposes only, and cannot be understood as indicating or implying relative importance or implicitly indicating the quantity of technical features as referred to. Therefore, the features defined by "first" and "second" may explicitly or implicitly include one or more of the features. In the descriptions of the present disclosure, unless otherwise stated, "a plurality" means two or more.

In the description of the present disclosure, it should be noted that the term of "installation", "connected", or "connecting" should be understood in a broad sense unless explicitly stated and limited. For example, it may be fixed or removable connection, or may be integral connection; it may be direct connection or indirect connection through an intermediate medium, or, it may be internal communication of two elements. For those of ordinary skill in the art, the specific meanings of the above terms in the present disclosure may be understood on a case-by-case basis.

In the descriptions of this specification, specific features, structures, materials, or characteristics may be combined in a suitable manner in any one or more embodiments or examples.

It should be understood that although the steps in the flowchart of the drawings are sequentially displayed in accordance with the directions of the arrows, these steps are not necessarily performed in the order indicated by the arrows. Unless explicitly stated herein, the execution of these steps is not strictly limited, and they may be performed in other orders. Moreover, at least a part of the steps in the flowchart of the drawings may include multiple sub-steps or multiple stages. These sub-steps or stages are not necessarily performed at the same time, but may be performed at different times; and they are not necessarily performed sequentially, but may be performed in turn or alternately with other steps or at least a part of sub-steps or stages of other steps.

The above descriptions are merely some embodiments of the present disclosure. It should be noted that for those of ordinary skill in the art, without departing from the principles of the present disclosure, various improvements and polishments can be made. These improvements and polishments should fall within the protection scope of the present disclosure.

What is claimed is:

1. A touch pen, comprising:
a pen body, a controller, a detecting part, and an accommodation part, wherein the controller, the detecting part, and the accommodation part are arranged on the pen body;
wherein the detecting part is provided with a current detecting circuit, there is a conductive fluid in the accommodation part, and the accommodation part is connected to the detecting part;
wherein at least a part of the current detecting circuit is located inside the detecting part, and the current detecting circuit is configured to contact the conductive fluid and form a circuit with the conductive fluid when the pen body is in a tilt posture, and output a corresponding reference value according to magnitude of a current in the circuit; and
wherein the controller is electrically connected to the current detecting circuit, and is configured to output a control signal according to the reference value,
wherein when the touch pen is in a vertical state, the current detecting circuit is not in contact with the conductive fluid.

2. The touch pen according to claim 1, wherein the current detecting circuit comprises a main circuit and a plurality of conductor branches;
wherein the main circuit comprises a power supply and a detector connected in series, a first end of the main circuit is connected to a fixed end of each of the plurality of conductor branches, and a second end of the main circuit and free ends of the plurality of conductor branches are arranged in the detecting part in a first direction at intervals;
wherein, when the pen body is in the tilt posture, the second end of the main circuit and the free end of at least one of the plurality of conductor branches are in contact with the conductive fluid, and the main circuit, the at least one of the plurality of conductor branches and the conductive fluid form the circuit; and
wherein the detector is electrically connected to the controller, and is configured to output the corresponding reference value according to the magnitude of the current in the circuit.

3. The touch pen according to claim 2, wherein the second end of the main circuit is a first ring-shaped wire, and the free end of the conductor branch is a second ring-shaped wire; and
wherein the first ring-shaped wire and the plurality of second ring-shaped wires are coaxial, and are arranged in the detecting part in the first direction at intervals.

4. The touch pen according to claim 3, wherein the conductor branch further comprises a first resistor, a first end of the main circuit is electrically connected to an end of the first resistor, and the other end of the resistor is electrically connected to the second ring-shaped wire.

5. The touch pen according to claim 3, wherein a hollow groove is axially arranged inside the pen body, the accommodation part and the detecting part are located in the hollow groove, and the accommodation part is located on a side of the detecting part close to a pen tip part of the pen body.

6. The touch pen according to claim 5, wherein the hollow groove is divided into a first region and a second region in an axial direction, which are adjacent;
wherein the accommodation part comprises the first region, and the detecting part comprises the second region; and
wherein the first ring-shaped wire and the plurality of the second ring-shaped wires are arranged in the second region in an axial direction at intervals.

7. The touch pen according to claim 3, further comprising a tubular member arranged inside or on an outer surface of the pen body, wherein the accommodation part and the detecting part are located in the tubular member, and the accommodation part is located on a side of the detecting part close to a pen tip part of the pen body.

8. The touch pen according to claim 7, wherein the tubular member is divided into a first portion and a second portion in an axial direction of the tubular member, which are adjacent;
   wherein the accommodation part comprises the first portion, and the detecting part comprises the second portion; and
   wherein the first ring-shaped wire and the plurality of the second ring-shaped wires are arranged in the second portion in an axial direction at intervals.

9. The touch pen according to claim 3, wherein the accommodation part comprises a first cavity for accommodating the conductive fluid, the detecting part is a cylinder, and the first cavity is connected to an inside of the detecting part; and
   wherein the first ring-shaped wire and the plurality of second ring-shaped wires are arranged in the detecting part in an axial direction of the detecting part at intervals.

10. The touch pen according to claim 1, wherein the controller is electrically connected to a pen tip part of the pen body, and is configured to transmit, to a screen of a first device via the pen tip part, an excitation signal having a first frequency according to the reference value.

11. The touch pen according to claim 10, wherein the first frequency and the reference value exhibit a positive correlation relationship or a negative correlation relationship.

12. The touch pen according to claim 1, wherein the controller is configured to communicate with a first communication circuit of a first device, and is configured to transmit a control signal to the first communication circuit according to the reference value, so that the first device performs a corresponding operation according to the control signal.

13. A touch device, comprising: a first device and a touch pen;
   wherein, the touch pen comprises a pen body, a controller, a detecting part, and an accommodation part, and the controller, the detecting part, and the accommodation part are arranged on the pen body;
   wherein the detecting part is provided with a current detecting circuit, there is a conductive fluid in the accommodation part, and the accommodation part is connected to the detecting part;
   wherein at least a part of the current detecting circuit is located inside the detecting part, and the current detecting circuit is configured to contact the conductive fluid and form a circuit with the conductive fluid when the pen body is in a tilt posture, and output a corresponding reference value according to magnitude of a current in the circuit;
   wherein the controller is electrically connected to the current detecting circuit, and is configured to output a control signal according to the reference value; and
   wherein the first device is configured to receive the control signal outputted by the controller of the touch pen,
   wherein when the touch pen is in a vertical state, the current detecting circuit is not in contact with the conductive fluid.

14. The touch device according to claim 13, wherein the first device is configured to: control, according to the control signal, a thickness of a line displayed on a screen, a brightness of a screen, an output volume of the first device, a position of a cursor displayed on a screen, or a vibration degree of the first device.

15. The touch device according to claim 13, wherein the current detecting circuit comprises a main circuit and a plurality of conductor branches;
   wherein the main circuit comprises a power supply and a detector connected in series, a first end of the main circuit is connected to a fixed end of each of the plurality of conductor branches, and a second end of the main circuit and free ends of the plurality of conductor branches are arranged in the detecting part in a first direction at intervals;
   wherein, when the pen body is in a tilt posture, the second end of the main circuit and the free end of at least one of the plurality of conductor branches are in contact with the conductive fluid, and the main circuit, the at least one of the plurality of conductor branches and the conductive fluid form the circuit; and
   wherein the detector is electrically connected to the controller, and is configured to output the corresponding reference value according to the magnitude of the current in the circuit.

16. The touch device according to claim 15, wherein the second end of the main circuit is a first ring-shaped wire, and the free end of the conductor branch is a second ring-shaped wire; and
   wherein the first ring-shaped wire and the plurality of second ring-shaped wires are coaxial, and are arranged in the detecting part in the first direction at intervals.

17. The touch device according to claim 16, wherein the conductor branch further comprises a first resistor, a first end of the main circuit is electrically connected to an end of the first resistor, and the other end of the resistor is electrically connected the second ring-shaped wire.

18. A method for controlling a touch pen, wherein the touch pen comprises:
   a pen body, a controller, a detecting part, and an accommodation part, wherein the controller, the detecting part, and the accommodation part are arranged on the pen body;
   wherein the detecting part is provided with a current detecting circuit, there is a conductive fluid in the accommodation part, and the accommodation part is connected to the detecting part;
   wherein at least a part of the current detecting circuit is located inside the detecting part, and the current detecting circuit is configured to contact the conductive fluid and form a circuit with the conductive fluid when the pen body is in a tilt posture, and output a corresponding reference value according to magnitude of a current in the circuit and
   wherein the controller is electrically connected to the current detecting circuit, and is configured to output a control signal according to the reference value,
   wherein when the touch pen is in a vertical state, the current detecting circuit is not in contact with the conductive fluid,
   wherein the method comprises:
   receiving a reference value, wherein the reference value is outputted when the pen body is in the tilt posture and the detecting part contacts the conductive fluid; and
   outputting a control signal according to the reference value.

19. The control method according to claim 18, wherein the outputting the control signal according to the reference value comprises at least one of:

transmitting a excitation signal having a first frequency to a screen of a first device via a pen tip part according to the reference value; or, transmitting a control signal to a first communication circuit of a first device according to the reference value, so that the first device performs a corresponding operation according to the control signal.

20. A non-transitory readable storage medium, having a program stored thereon, wherein, when the program is executed by a touch pen, the method for controlling the touch pen according to claim 18 is implemented.

\* \* \* \* \*